(12) United States Patent
Gupta et al.

(10) Patent No.: US 10,440,239 B1
(45) Date of Patent: Oct. 8, 2019

(54) SYSTEM AND METHOD FOR DETECTING PRESENCE OF A LIVING HOLD IN A VIDEO STREAM

(71) Applicant: Interra Systems Inc., Cupertino, CA (US)

(72) Inventors: Raman Kumar Gupta, Rajasthan (IN); Rishi Gupta, Noida (IN); Shekhar Madnani, Noida (IN); Bhupender Kumar, Palwal (IN)

(73) Assignee: Interra Systems, Cupertino, CA (US)

( * ) Notice: Subject to any disclaimer, the term of this patent is extended or adjusted under 35 U.S.C. 154(b) by 0 days.

(21) Appl. No.: 16/148,982

(22) Filed: Oct. 1, 2018

(51) Int. Cl.
*G06T 7/13* (2017.01)
*H04N 5/14* (2006.01)
*H04N 5/21* (2006.01)

(52) U.S. Cl.
CPC ............... *H04N 5/147* (2013.01); *G06T 7/13* (2017.01); *G06T 2207/10016* (2013.01); *H04N 5/21* (2013.01)

(58) Field of Classification Search
CPC ....................................................... G06T 7/10
See application file for complete search history.

(56) References Cited

U.S. PATENT DOCUMENTS

| | | | | |
|---|---|---|---|---|
| 5,450,134 A * | 9/1995 | Legate | ............... | H04H 20/14 348/467 |
| 8,036,494 B2 | 10/2011 | Chen | | |
| 9,818,178 B1 * | 11/2017 | Mogre | ................... | G06T 5/002 |
| 9,838,643 B1 * | 12/2017 | Madhav | ................ | H04N 5/911 |
| 10,275,894 B2 * | 4/2019 | Saini | ..................... | G06T 7/0004 |
| 10,332,243 B2 * | 6/2019 | Berge | .................... | G06T 7/0002 |
| 2012/0106797 A1 * | 5/2012 | Wang | ...................... | H04N 7/18 382/103 |
| 2017/0308998 A1 | 10/2017 | Wang et al. | | |

FOREIGN PATENT DOCUMENTS

| CN | 1770204 A | 5/2006 |
|---|---|---|
| CN | 104658008 B | 9/2017 |

OTHER PUBLICATIONS

Elhefnawy et al., "Robust Hybrid Foreground Detection and Adaptive Background Model", IEEE 2010, 8 pages.
Lijing et al., "Moving Target Recognition under Static Background", IEEE dated Dec. 29, 2014, 4 pages.

* cited by examiner

*Primary Examiner* — Paulos M Natnael
(74) *Attorney, Agent, or Firm* — Benjamin Balser; Next IP Law

(57) ABSTRACT

A system and a method for detecting presence of a living hold in a video stream are disclosed. The method comprises pre-processing N consecutive frames for eliminating noise. An edge score may be calculated for the N consecutive frames, and a clip threshold primary and a clip threshold secondary may be defined. The method further comprises identifying primary edges and secondary edges in the N consecutive frames. Successively, a percentage of fixed primary edges and percentage of fixed secondary edges may be determined. Presence of the living hold may be confirmed based on the value of the percentage of fixed primary edges and the percentage of fixed secondary edges.

12 Claims, 3 Drawing Sheets

SYSTEM AND METHOD FOR DETECTING PRESENCE OF A LIVING HOLD IN A VIDEO STREAM

FIELD OF THE DISCLOSURE

The present disclosure is generally related to a video processing technique, and more particularly related to detecting presence of a living hold in a video stream.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

There are various tools available for processing of videos for different purposes. There are several known tools for detection of foreground and background of a video stream. But, there is no known technique for detecting presence of a living hold in a video stream. A living hold may be defined as a slow moving graphic introduced at an end of a video stream. Generally, a living hold is present at an end of a video stream to indicate the viewers that the video is still playing and is not stuck. Because there are no available techniques and tools for detecting presence of the living holds, there remains a strong need of such a method.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
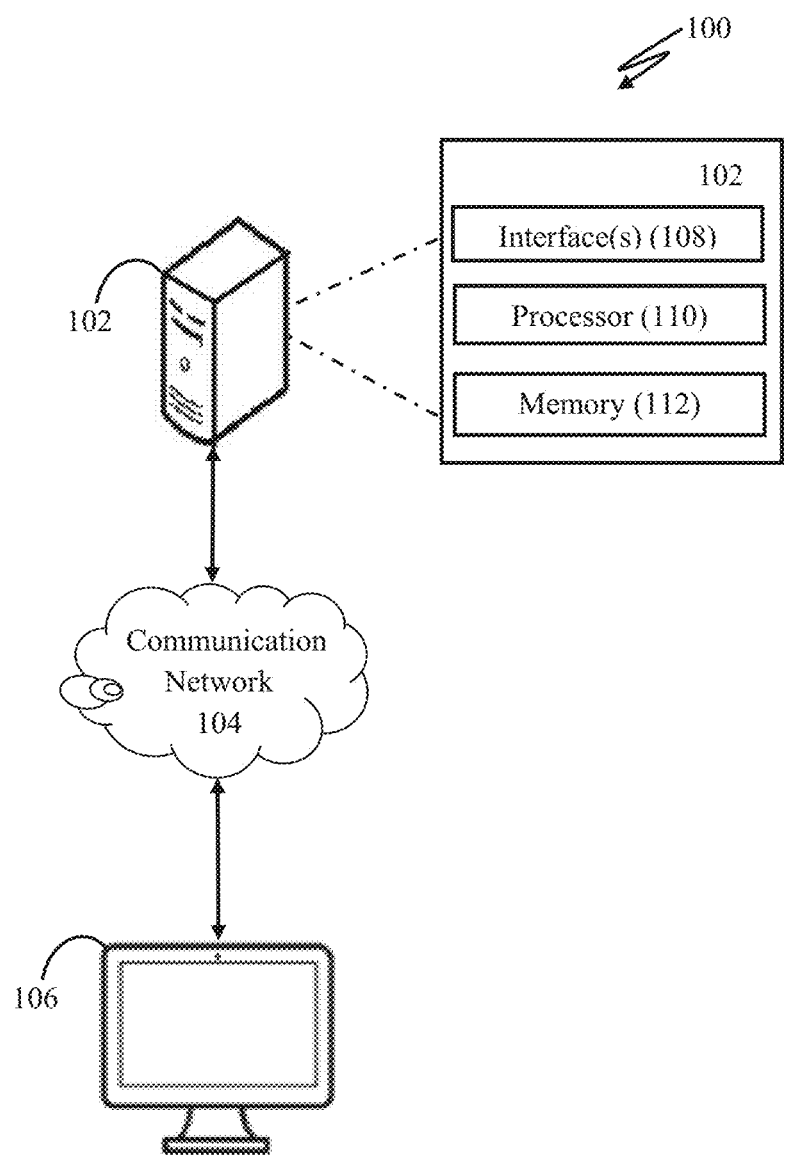
FIG. 1 illustrates a network connection diagram 100 of a system 102 for detecting presence of a living hold in a video stream, according to an embodiment.

FIG. 1 illustrates network connection diagram 100 of a system 102 for detecting presence of a living hold in a video stream, according to an embodiment. The system 102 may be connected to a communication network 104. The communication network 104 may further be connected with a device 106. Although the device 106 is illustrated as a desktop, but could be a mobile phone, smart phone, laptop, tablet, and a phablet. The device 106 may be used for playing the video stream comprising the living hold.

The communication network 104 may be a wired and/or a wireless network. The communication network 104, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The system 102 comprises interface(s) 108, processor 110, and a memory 112. The interface(s) 108 may help an operator to interact with the system 102. The interface(s) 108 of the system 102 may either accept an input from the operator or provide an output to the operator, or may perform both the actions. The interface(s) 108 may either be a Command Line Interface (CLI), Graphical User Interface (GUI), or a voice interface.

The processor 110 may execute an algorithm stored in the memory 112 for detecting presence of a living hold in a video stream. The processor 110 may also be configured to decode and execute any instructions received from one or more other electronic devices or server(s). The processor 110 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 110 may be configured to execute one or more computer-readable program instructions, such as program instructions to carry out any of the functions described in the description provided below.

The memory 112 may include, but is no limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

Figure 2A:
FIG. 2a and FIG. 2b illustrates consecutive frames of the living hold, according to an embodiment.
Figure 2B:
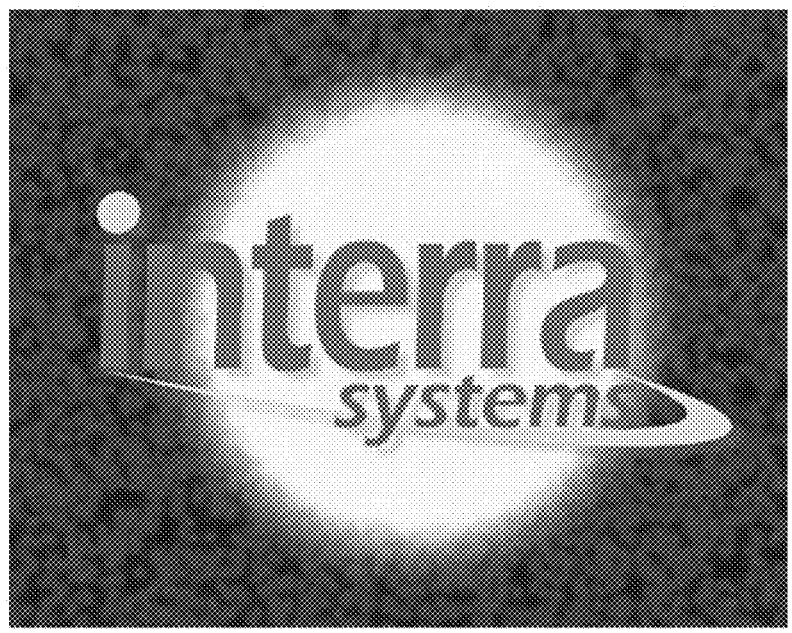

A living hold may refer to a slow and/or repeatedly moving graphic present at an end of a video stream. Presence of the living hold in the video stream would help viewers to identify that the video stream is playing and not stuck. The living hold may comprise a slow moving graphic having a static logo, a text, and the like. In one case, the living hold may depict information about a creator or a broadcaster. Such information could be depicted through a text present in the living hold, as shown using FIGS. 2a and 2b, illustrating two images of the living hold.

In one embodiment, the system 102 may receive a video stream for identifying presence of the living hold in the video stream. Thereafter, the processor 108 may execute an algorithm stored in the memory 112 to identify presence of the living hold. The algorithm processes edge characteristics of N consecutive frames and based on the processing, establishes whether the N consecutive frames are a part of Living Hold or not. The main principle behind operation of the algorithm is that edges of a main content (logo/text) will remain static while a slight motion in the background and non-salient edges may be observed, in a video stream.

At first, N consecutive frames may be pre-processed for eliminating noise present in the N consecutive frames. N may denote any natural number greater than one. In one case, N consecutive frames may be pre-processed using a median filter, for removing speckled noise. Post pre-processing, an edge score may be calculated for each of the N consecutive frame. Edge score may be computed based on a function of gradients in x-direction and y-direction, for the N consecutive frames. In one case, the edge scores may be determined as an absolute sum of gradient magnitudes in the x-direction and the y-direction, for the N consecutive frames.

Subsequently, a histogram may be computed using the edge scores. A clip threshold may be determined based on the histogram. The clip threshold may be a value corresponding to which a predefined percentage of pixels have higher edge score than the clip threshold. A clip threshold primary may be set as a function of a predefined threshold_1 and the clip threshold. In one case, the clip threshold primary may be set as a minimum value amongst the predefined threshold_1 and the clip threshold, as mentioned below in Equation 1.

$$\text{Clip threshold primary} = \min(\text{predefined threshold\_1}, \text{clip threshold}) \quad \text{Equation 1}$$

Further, a clip threshold secondary may be set as a function of a predefined threshold_2 and a predefined portion of the clip threshold primary. In one case, the clip threshold secondary may be set as a minimum value amongst the predefined threshold_2 and the predefined portion of the clip threshold primary, as mentioned below in Equation 2.

$$\text{Clip threshold secondary} = \min(\text{predefined threshold\_2}, \text{clip threshold primary/predefined divisor}) \quad \text{Equation 2}$$

In above equation 2, the predefined divisor may have a value greater than one.

Successive to defining the clip threshold primary and the clip threshold secondary, primary edges may be identified in the N consecutive frames. In one case, the primary edges may be identified where the edge scores are greater than the clip threshold primary, for the N consecutive frames. Further, secondary edges may be identified in the N consecutive frames. The secondary edges may be identified where the edge scores remain within a predefined range. In one case, the predefined range may be set between the clip threshold secondary and a function of the clip threshold secondary and a predefined threshold_3, for the N consecutive frames. For example, the predefined range may be set between the clip threshold secondary and a sum of the clip threshold secondary and the predefined threshold_3.

Thereafter, a percentage of fixed primary edges having same spatial locations in the N consecutive frames may be determined. Percentage of such primary edges having same spatial locations in the N consecutive frames may be identified as percent fixed PrimaryEdges. Further, a percentage of secondary edges having same spatial locations in the N consecutive frames may be determined. Percentage of such secondary edges having same spatial locations in the N consecutive frames may be identified as percent fixed SecondaryEdges.

Finally, presence of a living hold in the N consecutive frames may be confirmed while a value of the percent fixed PrimaryEdges is greater than a predefined threshold_4 and a value of percent fixed SecondaryEdges is less than a predefined threshold_5. It should be noted that the above mentioned predefined thresholds i.e. predefined threshold_1, predefined threshold_2, predefined threshold_3, predefined threshold_4, and predefined threshold_5 may be set based on experimentation, to suit performance of the system 102.

Figure 3:
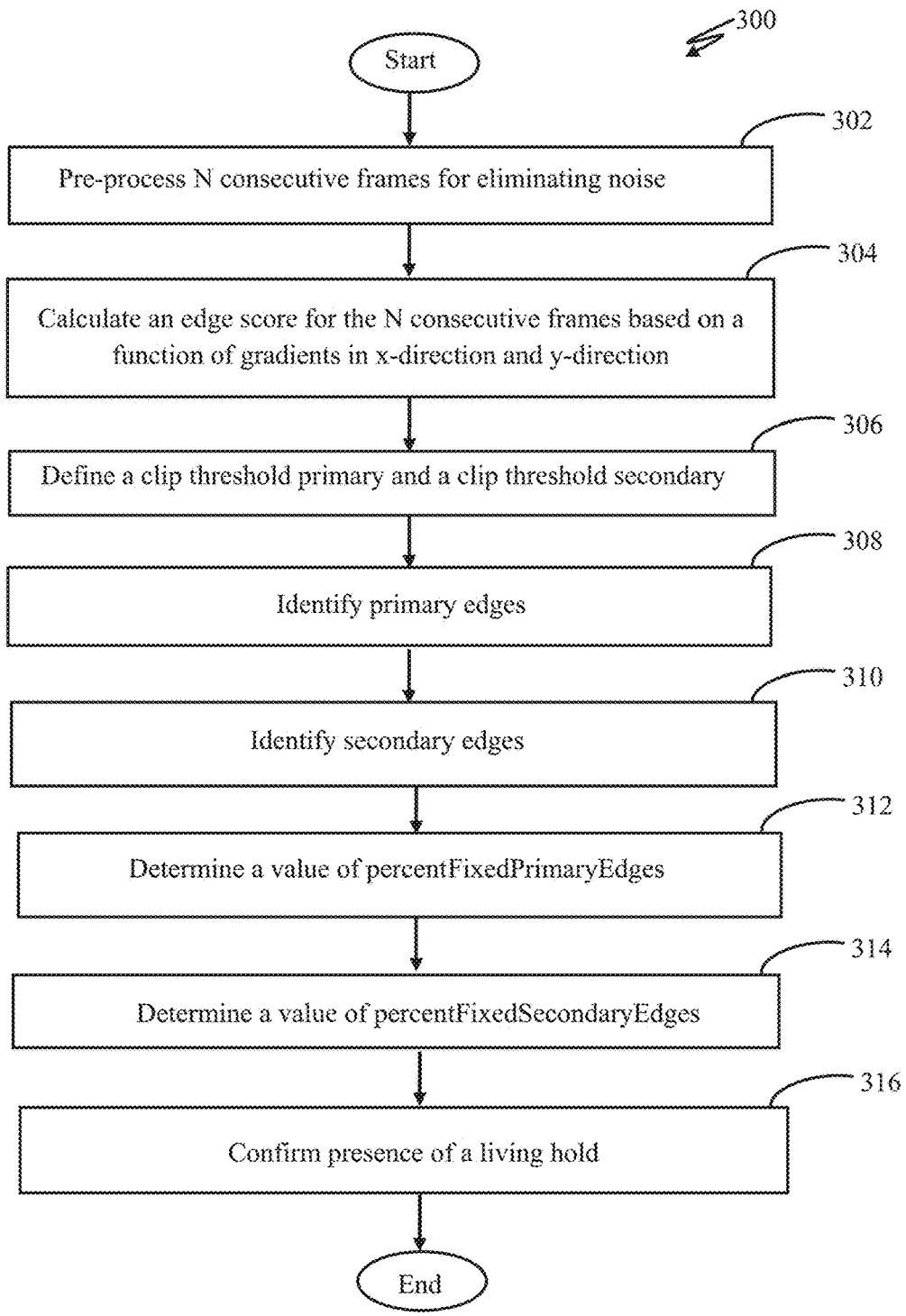
FIG. 3 illustrates a flowchart 300 showing a method for detecting presence of a living hold in a video stream, according to an embodiment.

FIG. 3 illustrates a flowchart 300 of a method of detecting presence of a living hold in a video stream, according to an embodiment. FIG. 3 comprises a flowchart 300 that is explained in conjunction with the elements disclosed in Figures explained above.

The flowchart 300 of FIG. 3 shows the architecture, functionality, and operation for detecting presence of a living hold in a video stream. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 300 starts at step 302 and proceeds to step 316.

At step 302, N consecutive frames may be pre-processed for eliminating noise present in the N consecutive frames. N may denote a natural number greater than one. A median filter may be used for pre-processing the N consecutive frames, in one embodiment.

At step 304, an edge score may be calculated for the N consecutive frames. In one case, the edge score may be calculated based on a function of gradients in x-direction and y-direction for the N consecutive frames.

At step 306, a clip threshold primary and a clip threshold secondary may be defined. The clip threshold primary may be defined as a function of a predefined threshold_1 and a clip threshold. Further, the clip threshold secondary may be defined as a function of a predefined threshold_2 and a predefined portion of the clip threshold primary.

At step 308, primary edges having the edge score greater than the clip threshold primary, for the N consecutive frames, may be identified.

At step 310, secondary edges having the edge score ranging between the clip threshold secondary and a function of the clip threshold secondary and a predefined threshold 3, for the N consecutive frames, may be identified.

At step 312, a percentage of fixed primary edges having same spatial locations in the N consecutive frames may be determined. Percentage of such primary edges having same spatial locations in the N consecutive frames may be identified as percent fixed PrimaryEdges.

At step 314, a percentage of fixed secondary edges having same spatial locations in the N consecutive frames may be determined. Percentage of such secondary edges having same spatial locations in the N consecutive frames may be identified as percent fixed SecondaryEdges.

At step 316, presence of a living hold in the N consecutive frames may be confirmed. Presence of the living hold may be confirmed while the value of the percent fixed PrimaryEdges is greater than a predefined threshold_4 and the value of percent fixed SecondaryEdges is less than a predefined threshold_5.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method for detecting presence of a living hold in a video stream, the method comprising:
   pre-processing, by a processor, N consecutive frames for eliminating noise present in the N consecutive frames, wherein N is a natural number greater than one;
   calculating, by the processor, an edge score for each of the N consecutive frames based on a function of gradients in x-direction and y-direction for the N consecutive frames;
   computing, by the processor, a clip threshold primary as a function of a predefined threshold_1 and a clip threshold, and computing a clip threshold secondary as a function of a predefined threshold_2 and a predefined portion of the clip threshold primary;
   identifying, by the processor, primary edges having the edge score greater than the clip threshold primary, for the N consecutive frames;
   identifying, by the processor, secondary edges having the edge score ranging between the clip threshold secondary and a function of the clip threshold secondary and a predefined threshold_3, for the N consecutive frames;
   determining, by the processor, a percentage of fixed primary edges having same spatial locations in the N consecutive frames;
   determining, by the processor, a percentage of fixed secondary edges having same spatial locations in the N consecutive frames; and
   confirming, by the processor, presence of a living hold in the N consecutive frames while the percentage of fixed primary edges is greater than a predefined threshold_4 and the percentage of fixed secondary edges is less than a predefined threshold_5.

2. The method of claim 1, wherein the clip threshold primary is defined as a minimum value amongst the predefined threshold_1 and the clip threshold, and the clip threshold secondary is defined as a minimum value amongst the predefined threshold_2 and the predefined portion of the clip threshold primary.

3. The method of claim 1, further comprising calculating the clip threshold as a value corresponding to which a predefined percentage of pixels have higher edge score than the clip threshold.

4. The method of claim 2, further comprising calculating the clip threshold as a value corresponding to which a predefined percentage of pixels have higher edge score than the clip threshold.

5. A system for detecting presence of a living hold in a video stream, the system comprising:
   a processor; and
   a memory, wherein the processor is configured to execute programmed instructions stored in the memory to:
      pre-process N consecutive frames for eliminating noise present in the N consecutive frames, wherein N is a natural number greater than one;
      calculate an edge score for each of the N consecutive frames based on a function of gradients in x-direction and y-direction for the N consecutive frames;
      compute a clip threshold primary as a function of a predefined threshold_1 and a clip threshold, and compute a clip threshold secondary as a function of a predefined threshold_2 and a predefined portion of the clip threshold primary;
      identify primary edges having the edge score greater than the clip threshold primary, for the N consecutive frames;
      identify secondary edges having the edge score ranging between the clip threshold secondary and a function of the clip threshold secondary and a predefined threshold_3, for the N consecutive frames;
      determine a percentage of fixed primary edges having same spatial locations in the N consecutive frames;
      determine a percentage of fixed secondary edges having same spatial locations in the N consecutive frames; and
      confirm presence of a living hold in the N consecutive frames while the percentage of fixed primary edges is greater than a predefined threshold_4 and the percentage of fixed secondary edges is less than a predefined threshold_5.

6. The system of claim 5, wherein the clip threshold primary is defined as a minimum value amongst the predefined threshold_1 and the clip threshold, and the clip threshold secondary is defined as a minimum value amongst the predefined threshold_2 and the predefined portion of the clip threshold primary.

7. The system of claim 5, further comprising calculating the clip threshold as a value corresponding to which a predefined percentage of pixels have higher edge score than the clip threshold.

8. The system of claim 6, further comprising calculating the clip threshold as a value corresponding to which a predefined percentage of pixels have higher edge score than the clip threshold.

9. A non-transient computer-readable medium comprising instructions for causing a programmable processor to detect presence of a living hold in a video stream by:

pre-processing N consecutive frames for eliminating noise present in the N consecutive frames, wherein N is a natural number greater than one;

calculating an edge score for each of the N consecutive frames based on a function of gradients in x-direction and y-direction for the N consecutive frames;

computing a clip threshold primary as a function of a predefined threshold_1 and a clip threshold, and computing a clip threshold secondary as a function of a predefined threshold_2 and a predefined portion of the clip threshold primary;

identifying primary edges having the edge score greater than the clip threshold primary, for the N consecutive frames;

identifying secondary edges having the edge score ranging between the clip threshold secondary and a function of the clip threshold secondary and a predefined threshold_3, for the N consecutive frames;

determining a percentage of fixed primary edges having same spatial locations in the N consecutive frames;

determining a percentage of fixed secondary edges having same spatial locations in the N consecutive frames; and confirming presence of a living hold in the N consecutive frames while the value of the percentage of fixed primary edges is greater than a predefined threshold_4 and the percentage of fixed secondary edges is less than a predefined threshold_5.

10. The non-transient computer-readable medium of claim 9, wherein the clip threshold primary is defined as a minimum value amongst the predefined threshold_1 and the clip threshold, and the clip threshold secondary is defined as a minimum value amongst the predefined threshold_2 and the predefined portion of the clip threshold primary.

11. The non-transient computer-readable medium of claim 9, further comprising instructions for calculating the clip threshold as a value corresponding to which a predefined percentage of pixels have higher edge score than the clip threshold.

12. The non-transient computer-readable medium of claim 10, further comprising instructions for calculating the clip threshold as a value corresponding to which a predefined percentage of pixels have higher edge score than the clip threshold.

\* \* \* \* \*